United States Patent
Tatebe et al.

(10) Patent No.: US 12,122,232 B2
(45) Date of Patent: Oct. 22, 2024

(54) ACCELERATOR PEDAL APPARATUS

(71) Applicant: SUBARU CORPORATION, Tokyo (JP)

(72) Inventors: Takanori Tatebe, Tokyo (JP); Naoto Yabuki, Tokyo (JP); Kazuki Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/116,733

(22) Filed: Mar. 2, 2023

(65) Prior Publication Data

US 2023/0311651 A1 Oct. 5, 2023

(30) Foreign Application Priority Data

Mar. 30, 2022 (JP) .................... 2022-056259

(51) Int. Cl.
*B60K 26/02* (2006.01)

(52) U.S. Cl.
CPC ...... *B60K 26/021* (2013.01); *B60K 2026/022* (2013.01)

(58) Field of Classification Search
None
See application file for complete search history.

(56) References Cited

U.S. PATENT DOCUMENTS

| | | | | |
|---|---|---|---|---|
| 9,520,036 | B1* | 12/2016 | Buuck | G06F 3/016 |
| 2012/0169488 | A1* | 7/2012 | Thiel | B60K 26/021 |
| | | | | 340/438 |
| 2012/0191312 | A1* | 7/2012 | Kimura | B60K 26/021 |
| | | | | 701/70 |
| 2014/0298949 | A1* | 10/2014 | Brown | G05G 1/40 |
| | | | | 74/513 |
| 2016/0159216 | A1* | 6/2016 | Konigorski | B60K 26/021 |
| | | | | 74/513 |

FOREIGN PATENT DOCUMENTS

| | | |
|---|---|---|
| JP | 2002-104153 A | 4/2002 |
| JP | 2007-022396 A | 2/2007 |
| JP | 2008-077631 A | 4/2008 |
| JP | 2017138764 A * | 8/2017 |

OTHER PUBLICATIONS

USPTO Machine Translation of the Description of JP 2017138764 A, Ivan et al., Aug. 10, 2017. (Year: 2023).*
EPO Machine Translation of the Description of JP 2008077631 A, Nakajima et al., Apr. 3, 2008. (Year: 2023).*

* cited by examiner

*Primary Examiner* — Daniel D Yabut
(74) *Attorney, Agent, or Firm* — MCGINN I.P. LAW GROUP, PLLC

(57) ABSTRACT

An accelerator pedal apparatus in which an acceleration operation for a vehicle is to be performed by a pedal configured to be operated by a foot includes a vibration application unit and a vibration application control processor. The vibration application unit is configured to apply vibration to the pedal. The vibration application control processor is configured to cause the vibration application unit to apply the vibration to the pedal with a vibration application waveform including one or both of a frequency component that is higher than or equal to 10 hertz and lower than or equal to 50 hertz and a frequency component that is higher than or equal to 100 hertz and lower than or equal to 300 hertz.

12 Claims, 9 Drawing Sheets

ACCELERATOR PEDAL APPARATUS

CROSS-REFERENCE TO RELATED APPLICATIONS

The present application claims priority from Japanese Patent Application No. 2022-056259 filed on Mar. 30, 2022, the entire contents of which are hereby incorporated by reference.

BACKGROUND

The disclosure relates to an accelerator pedal apparatus that receives an acceleration operation for a vehicle such as an automobile.

A technique related to a pedal-type operation apparatus for a vehicle such as an automobile is disclosed, for example, in Japanese Unexamined Patent Application Publication (JP-A) No. 2007-022396. JP-A No. 2007-022396 discloses a pedal apparatus for a vehicle. The pedal apparatus is configured to perform reliable notification to a driver by effectively applying vibration to a pedal. The vehicle pedal apparatus includes a reaction force adding unit, a vibration application unit, and a vibration application controller. The reaction force adding unit adds reaction force to a pedal member in accordance with a depressing operation. The vibration application unit applies vibration to the pedal member. The vibration application controller controls a vibration frequency of the vibration application unit. The pedal apparatus for a vehicle controls the vibration frequency in applying vibration on the basis of a resonance frequency of the pedal member.

Japanese Unexamined Patent Application Publication No. 2008-077631 discloses an information presentation apparatus for a vehicle. The information presentation apparatus is configured to reliably present information without giving an unpleasant feeling or a sense of incongruity to a driver. The information presentation apparatus presents notification information by causing selected vibrators to vibrate for a detected risky situation so that one or more of the frequency of vibration, presentation time of vibration, a vibration amplitude, and a presentation time interval of the vibrators match a human tactile sensation characteristic and a driver perceives apparent movement phenomenon.

Japanese Unexamined Patent Application Publication No. 2002-104153 discloses a technique to obtain vehicle information from a brake pedal. In the disclosed technique, a reaction force actuator is provided. The reaction force actuator applies pedal reaction force to the brake pedal. The pedal reaction force is adjusted to transmit information regarding a vehicle to a driver via the brake pedal.

SUMMARY

An aspect of the disclosure provides an accelerator pedal apparatus in which an acceleration operation for a vehicle is to be performed by an accelerator pedal. The pedal is configured to be operated by a foot. The accelerator pedal apparatus includes a vibration application unit and a vibration application control processor. The vibration application unit is configured to apply vibration to the pedal. The vibration application control processor is configured to cause the vibration application unit to apply the vibration to the pedal with a vibration application waveform including one or both of a frequency component that is higher than or equal to 10 hertz and lower than or equal to 50 hertz and a frequency component that is higher than or equal to 100 hertz and lower than or equal to 300 hertz.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
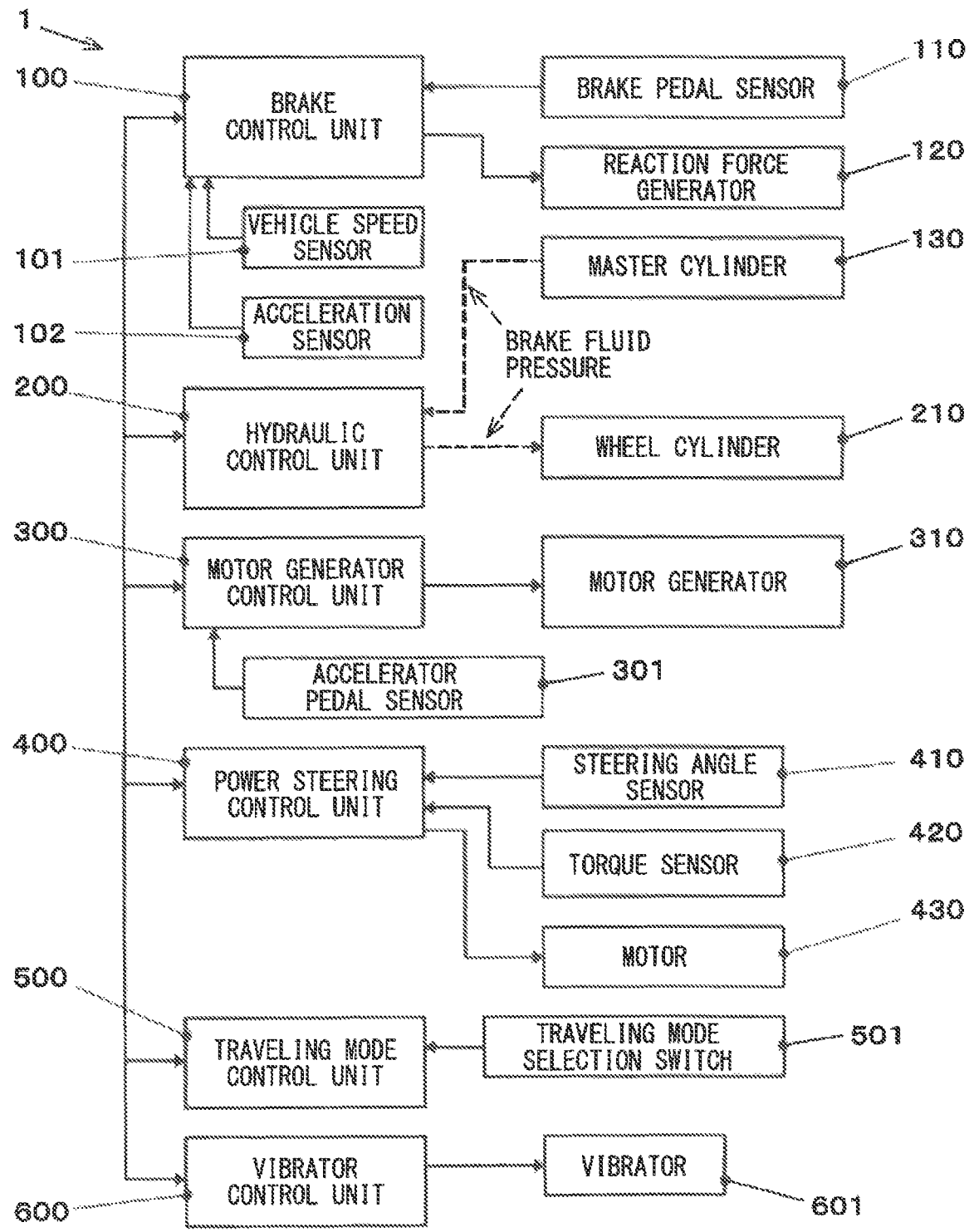
FIG. 1 is a diagram schematically illustrating a system configuration of a vehicle that includes an accelerator pedal apparatus according to an example embodiment of the disclosure.

Upon performing an operation on an accelerator pedal, a driver feels, for example, reaction force or pedal effort caused by a spring, acceleration of a vehicle, and behavior of the vehicle, and finely adjusts an amount of the operation.

However, the spatial resolution of an operation performed by a human can lower in accordance with a decrease in reaction force, which decreases accuracy of the operation.

To address this, the reaction force may be increased with respect to an acceleration operation, for example, by increasing the spring constant of the spring. However, this can increase force to perform the acceleration operation, which can give a feeling of fatigue or a feeling of strangeness to the driver.

It is desirable to provide an accelerator pedal apparatus that is able to improve accuracy of an operation performed by an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In the following, a description is given of an accelerator pedal apparatus according to an example embodiment of the disclosure.

The accelerator pedal apparatus according to the example embodiment may be configured to allow for an acceleration operation for an electric vehicle. The electric vehicle may be, for example, an automobile such as a passenger car, and may include a motor generator as a traveling power source.

FIG. 1 is a diagram schematically illustrating an example of a system configuration of a vehicle that includes the accelerator pedal apparatus according to the example embodiment.

In FIG. 1, a solid line indicates electrical coupling, and a dashed line indicates transmission of a hydraulic pressure of a brake fluid.

Figure 2:
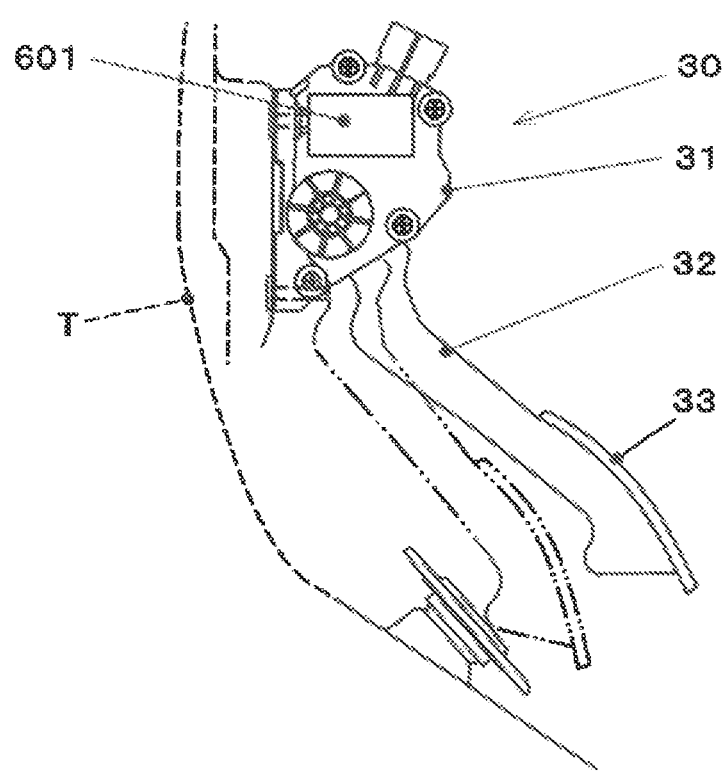
FIG. 2 is a schematic diagram illustrating a configuration of a pedal member according to the example embodiment.

FIG. 2 is a schematic diagram illustrating a configuration of a pedal unit according to the example embodiment.

The vehicle 1 may include, for example, a brake control unit 100, a hydraulic control unit (HCU) 200, a motor generator control unit 300, an accelerator pedal 30, a power steering control unit 400, a traveling mode control unit 500, and a vibrator control unit 600. For the accelerator pedal 30, see FIG. 2.

The brake control unit 100, the hydraulic control unit 200, the motor generator control unit 300, the power steering control unit 400, the traveling mode control unit 500, and the vibrator control unit 600 may each include a microcomputer. The microcomputer may include, for example, a data processor, a storage, an input/output interface, and a bus. The data processor may be a central processing unit (CPU), for example. The storage may be a random-access memory (RAM) and a read-only memory (ROM), for example. The bus may couple the data processor, the storage, and the input/output interface to each other.

In addition, for example, the brake control unit 100, the hydraulic control unit 200, the motor generator control unit 300, the power steering control unit 400, the traveling mode control unit 500, and the vibrator control unit 600 may be coupled to each other via an in-vehicle local area network (LAN) or may be coupled directly to each other, thus being communicable with each other. The LAN network may be a controller area network (CAN) communication system, for example.

The brake control unit 100 may perform a regenerative-friction brake coordination control in accordance with an operation received by an unillustrated brake pedal. In the regenerative-friction brake coordination control, the brake control unit 100 may control a hydraulic friction brake and a regenerative brake in a coordinated manner.

In addition, the brake control unit 100 may perform an anti-lock brake control and a behavior stabilization control.

The anti-lock brake control may be a control of cyclically reducing braking force applied to a wheel in a case where locking of rotation of the wheel, or a wheel lock, is detected while braking is performed.

The behavior stabilization control may be a control of generating a yaw moment in a restoring direction with use of a difference in braking force between right and left wheels upon occurrence of understeer behavior or oversteer behavior.

Coupled to the brake control unit 100 may be a vehicle speed sensor 101, an acceleration sensor 102, a brake pedal sensor 110, and a reaction force generator 120.

The vehicle 1 may further include a braking device. The braking device may include a master cylinder 130.

The vehicle speed sensor 101 may be provided at an unillustrated hub bearing housing. The hub bearing housing may rotatably support wheels. The vehicle speed sensor 101 may generate a vehicle speed signal corresponding to a rotation angular velocity of each of the wheels.

The brake control unit 100 may calculate a traveling speed, or a vehicle speed, of the vehicle 1 on the basis of an output of the vehicle speed sensor 101.

In one embodiment, the vehicle speed sensor 101 may serve as a "vehicle speed detector".

The acceleration sensor 102 may be provided at a so-called unsprung portion in an unillustrated suspension. The suspension may support a wheel with respect to a vehicle body in a strokable manner.

The acceleration sensor 102 may detect, for example, vertical acceleration of a member provided on an unsprung side. Examples of the member provided on the unsprung side may include a suspension arm and the hub bearing housing.

In one embodiment, the acceleration sensor 102 may serve as a "vibration input detector". The vibration input detector may detect a vibration input from a road surface.

In addition, the brake control unit 100 may be provided with sensors to perform, for example, the behavior stabilization control described above. Such sensors may include, for example, an unillustrated longitudinal acceleration sensor, an unillustrated lateral acceleration sensor, and an unillustrated yaw rate sensor.

The brake pedal sensor 110 may include an encoder. The encoder may detect an amount of an operation received by the brake pedal, i.e., a depressed amount of the brake pedal.

In accordance with a command given from the brake control unit 100, the reaction force generator 120 may generate reaction force in a direction in which the brake pedal returns to an initial position, i.e., a position of the brake pedal in a non-depressed state.

The reaction force generator 120 may generate the reaction force, for example, with use of a driving power source such as an electric actuator, for example, upon the use of the regenerative brake.

The master cylinder 130 may apply pressure to the brake fluid in accordance with a depressing operation of a depressing surface member of the brake pedal. The brake fluid may be a working fluid of the friction brake.

The brake fluid pressure generated by the master cylinder 130 may be transmitted to the hydraulic control unit 200 via a pipe.

The hydraulic control unit 200 may be a hydraulic pressure control device that individually adjusts the brake fluid pressure of a wheel cylinder 210 of each of the wheels.

The hydraulic control unit 200 may include an electric pump that applies pressure to the brake fluid. The hydraulic control unit 200 may also include valves that control the brake fluid pressure of the wheel cylinder 210 of each of the wheels. Such valves may include, for example, a pressure-increasing valve, a pressure-reducing valve, and a pressure holding valve.

For example, the master cylinder 130 and the wheel cylinder 210 may be coupled to the hydraulic control unit 200 via a brake fluid pipe.

The brake fluid pressure generated by the master cylinder 130 may be transmitted to the wheel cylinder 210 via the hydraulic control unit 200.

The hydraulic control unit 200 may override the brake fluid pressure generated by the master cylinder 130 to increase and decrease the brake fluid pressure of the wheel cylinder 210 of each of the wheels.

The wheel cylinder 210 may be provided for each of the wheels. The wheel cylinder 210 may generate friction force or braking force corresponding to the brake fluid pressure by pressing a brake pad against a disc rotor, for example.

In addition, in a case where the brake control unit 100 performs the regenerative-friction brake coordination control, if the control of the regenerative brake is performed and a ratio of the control of the regenerative brake to the control of the hydraulic friction brake increases, the hydraulic control unit 200 may reduce or block the brake fluid pressure transmitted from the master cylinder 130.

In this case, the driver can feel as if the hydraulic friction brake is used. The brake control unit 100 may therefore generate the reaction force of the brake pedal with use of the reaction force generator 120.

The motor generator control unit 300 may comprehensively control a motor generator 310 and accessories thereof.

The motor generator 310 may be a rotating electric machine that is to be used as a traveling power source of the vehicle 1.

The motor generator control unit 300 may include an inverter, for example. The inverter may be configured to supply the motor generator 310 with electric power supplied from a power source such as a traveling battery.

For example, the motor generator 310 may be mounted on the vehicle body or a sprung portion, and may transmit driving force to the wheels via components including, without limitation, a differential and a drive shaft. However, this is non-limiting. Alternatively, the motor generator 310 may be an in-wheel type motor, for example.

The motor generator control unit 300 may perform switching between a driving mode and a regeneration mode. The driving mode may be a mode in which the motor generator 310 generates output torque. The regeneration mode may be a mode in which the motor generator 310 performs regeneration to thereby absorb torque transmitted from the wheel side and generate braking force.

In the driving mode, the motor generator control unit 300 may perform a control in such a manner that actual torque generated by the motor generator 310 matches required torque. The required torque may be set on the basis of, for example, an amount of an operation received by the accelerator pedal 30, i.e., an operation amount of the accelerator pedal 30.

In the regeneration mode, the motor generator control unit 300 may control the torque absorbed by the motor generator 310 in accordance with requested braking force in a command given by the brake control unit 100.

The accelerator pedal 30 illustrated in FIG. 2 may be an operation member to be depressed by a foot and to receive an acceleration operation performed by the driver.

The accelerator pedal 30 may include, for example, a bracket 31, a lever 32, and a depressing surface member 33.

The bracket 31 may be a base that supports the lever 32 in such a manner that the lever 32 is pivotable about a rotation axis. The rotation axis may extend along a vehicle width direction.

The bracket 31 may include an unillustrated spring that biases the lever 32 in a direction in which the lever 32 is restored to an initial position side.

The bracket 31 may be attached to a toe board T. The toe board T may be a partition provided in a front portion of a vehicle compartment.

The lever 32 may be a member protruding from the bracket 31 in a lower and obliquely rearward direction.

The depressing surface member 33 may be provided at a protruding end of the lever 32, i.e., at an end of the lever 32 opposite to the bracket 31. The depressing surface member 33 may be to come into contact with the sole of the occupant's foot.

Coupled to the motor generator control unit 300 may be an accelerator pedal sensor 301.

The accelerator pedal sensor 301 may include an encoder. The encoder may detect a rotation angle position of the lever 32 of the accelerator pedal 30.

The accelerator pedal sensor 301 may be provided at the bracket 31.

In one embodiment, the accelerator pedal sensor 301 may serve as an "operation speed detector".

The motor generator control unit 300 may detect an amount by which the depressing surface member 33 is moved forward from an initial position, i.e., a depressed amount of the depressing surface member 33, on the basis of the output of the accelerator pedal sensor 301.

The power steering control unit 400 may comprehensively control an electric power steering system. The electric power steering system may supply an unillustrated steering device, for example, with assist force corresponding to a steering operation performed by the driver and with steering force for automatic steering. The steering device may perform steering of wheels of the vehicle 1 to be steered. The wheels of the vehicle 1 to be steered may typically be front wheels.

Coupled to the power steering control unit 400 may be a steering angle sensor 410, a torque sensor 420, and a motor 430, for example.

The steering angle sensor 410 may be a sensor that detects a steering angle of the steering device, i.e., a steering angle detector.

The torque sensor 420 may detect torque applied to a steering shaft to which an unillustrated steering wheel is coupled. The steering wheel may receive a steering operation performed by the driver.

The power steering control unit 400 may control the assist force in accordance with, for example, the torque detected by the torque sensor 420.

The motor 430 may be an electric actuator that applies the assist force and the steering force to the steering device and generates rack thrust.

The output of the motor 430 may be controlled by the power steering control unit 400.

The traveling mode control unit 500 may switch a traveling characteristic of the vehicle 1 in accordance with a traveling mode selection operation received from the driver.

Coupled to the traveling mode control unit 500 may be a traveling mode selection switch 501. The traveling mode selection switch 501 may receive the traveling mode selection operation performed by the driver.

The traveling mode may include, for example, a normal mode and an icy and snowy road traveling mode. The normal mode may be used for normal traveling. The icy and snowy road traveling mode may be used for traveling on icy and snowy roads.

In a case where the icy and snowy road traveling mode is selected, for example, the brake control unit 100 may change the anti-lock brake control and the behavior stabilization control to be optimized for a road having a low coefficient of friction.

In addition, the motor generator control unit 300 may change a rising characteristic of the torque of the motor generator 310 with respect to the operation amount of the accelerator pedal 30 to be more moderate. In other words, the motor generator control unit 300 may decrease a rate of an increase in the torque with respect to an increase in the operation amount.

The vibrator control unit 600 may supply a vibrator 601 with a driving current having a predetermined vibration application waveform and a driving voltage having a predetermined vibration application waveform. In one embodiment, the vibrator control unit 600 may serve as a "vibration application control processor".

The vibrator 601 may apply vibration to a member such as the depressing surface member 33 of the accelerator pedal 30. In one embodiment, the vibrator 601 may serve as a "vibration application unit".

The vibrator 601 may include a voice coil and a diaphragm, for example. The voice coil and the diaphragm may generate vibration corresponding to variation in the supplied driving voltage.

For example, a small speaker may be used as the vibrator 601.

For example, as illustrated in FIG. 2, the vibrator 601 may be attached to the bracket 31 of the accelerator pedal 30.

The vibration of the vibrator 601 may sequentially propagate along the bracket 31, the lever 32, and the depressing surface member 33 and may be transmitted to the driver's foot.

Figure 3:
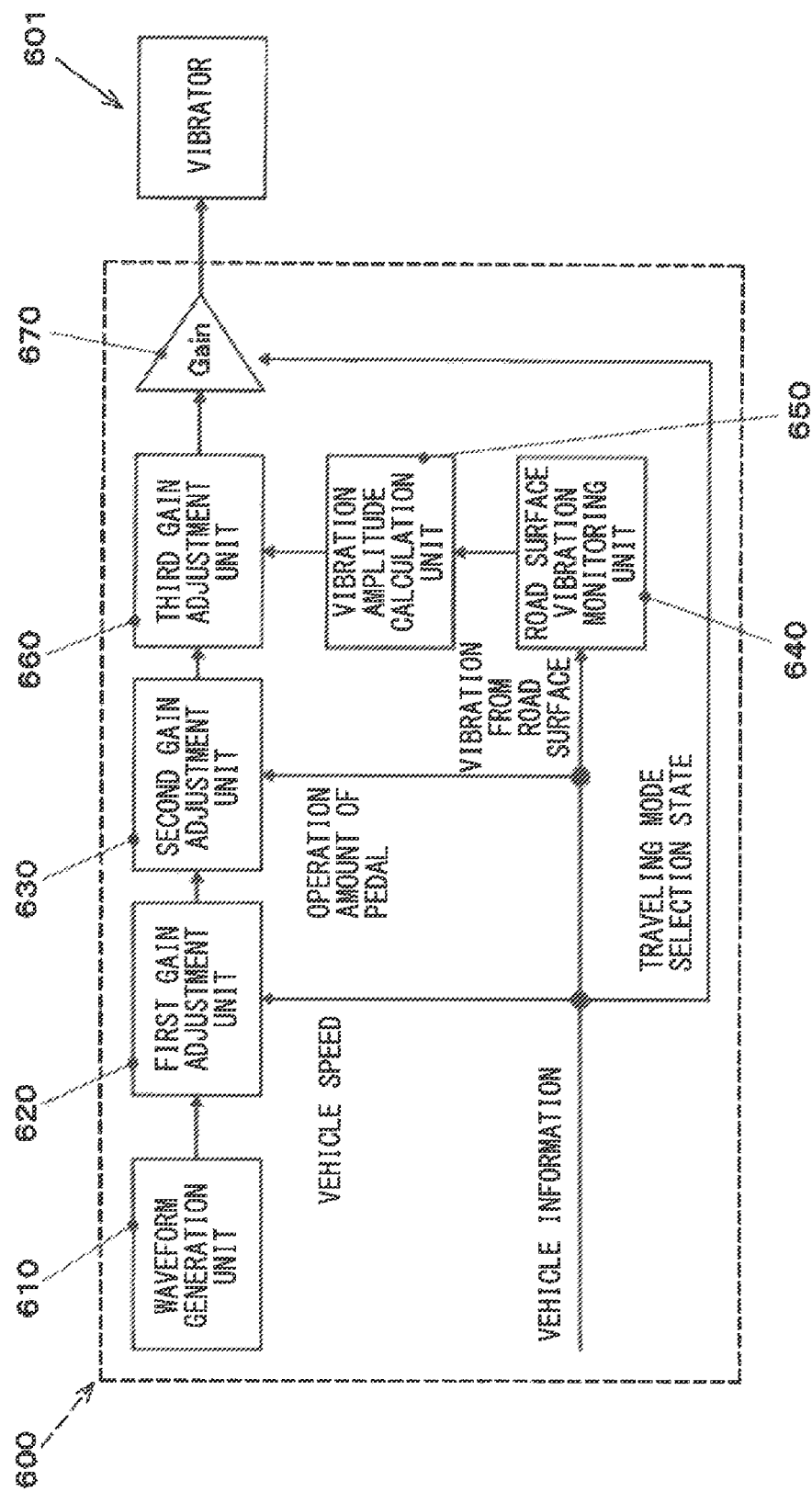
FIG. 3 is a diagram schematically illustrating a configuration of a vibrator control unit according to the example embodiment.

FIG. 3 is a diagram schematically illustrating a configuration of the vibrator control unit 600 according to the example embodiment.

The vibrator control unit 600 may include, for example, a waveform generation unit 610, a first gain adjustment unit 620, a second gain adjustment unit 630, a road surface vibration monitoring unit 640, a vibration amplitude calculation unit 650, a third gain adjustment unit 660, and a gain selection unit 670.

The waveform generation unit 610 may generate a basic wave of a vibration application waveform that is a voltage waveform of a driving electric power for the vibrator 601. The basic wave may be a wave that has not yet subjected to adjustment such as gain adjustment.

Figure 4:
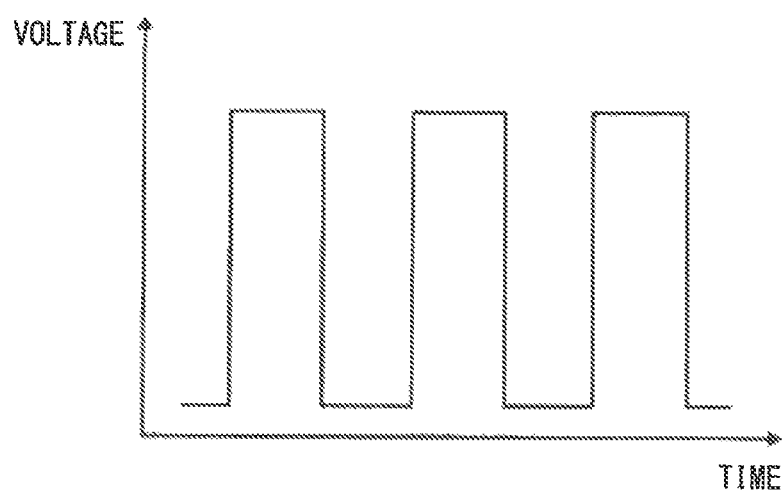
FIG. 4 is a diagram schematically illustrating an example of a vibration application waveform according to the example embodiment.

FIG. 4 is a diagram schematically illustrating an example of the vibration application waveform according to the example embodiment.

In FIG. 4, the horizontal axis represents time, and the vertical axis represents a voltage.

As illustrated in FIG. 4, the vibration application waveform may be a rectangular wave, for example. However, the vibration application waveform is not particularly limited in type and may be any other waveform.

According to the example embodiment, the frequency of the vibration application waveform may be set to have a dominant frequency within a range from 100 Hz to 300 Hz both inclusive, for example.

Note that, as used herein, the "dominant frequency" refers to a frequency having an amplitude relatively great as compared with other frequencies. Generally, the dominant frequency may often be substantially the same as a frequency that has a relatively great amplitude among natural values or natural frequencies.

Reasons why the frequency of the vibration application waveform may be set to have the above-described dominant frequency will be described below.

Examples of sensory receptors, or tactile sensors, by which the driver's foot touching the depressing surface member 33 acquires a tactile sensation, or skin sensation, may include Merkel cells, Meissner corpuscles, and Pacinian corpuscles.

Figure 5:
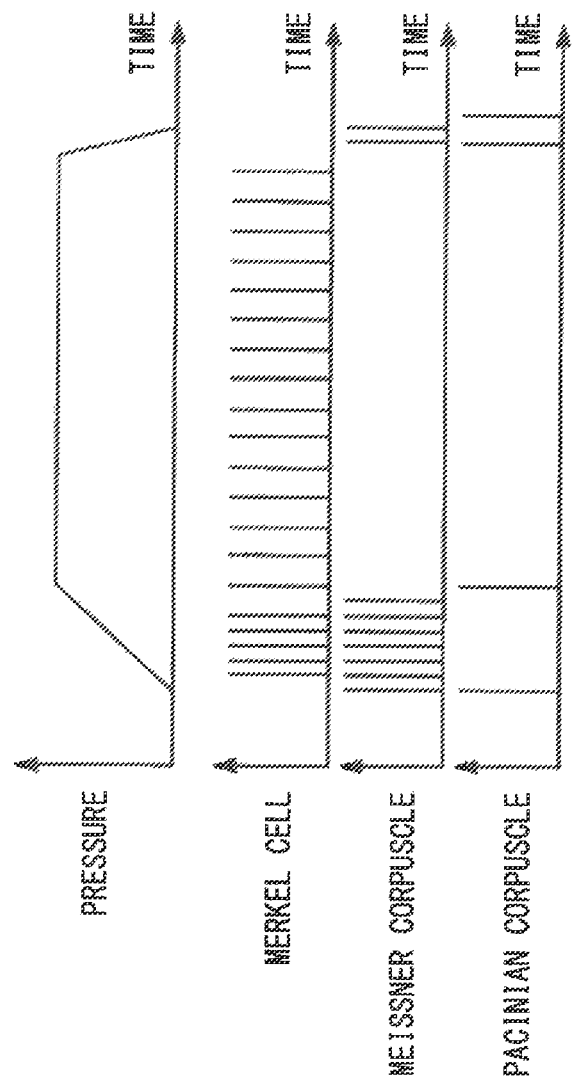
FIG. 5 is a diagram schematically illustrating timings of electric pulses outputted by respective receptors in a case where the skin receives pressure.

FIG. 5 is a diagram schematically illustrating timings of electric pulses outputted by respective receptors in a case where the skin touches an object.

In FIG. 5, the horizontal axes represent time, and the vertical axes represent, in order from the top, pressure, an electric pulse generation state of the Merkel cells, an electric pulse generation state of the Meissner corpuscles, and an electric pulse generation state of the Pacinian corpuscles.

The Merkel cells respond relatively slowly and may react to a DC component.

The Meissner corpuscles may react to a situation where a rate of variation in contact pressure, i.e., a speed, is present.

Because the Meissner corpuscles usually react when the speed is present, if a noise signal having a frequency to which the Meissner corpuscles are highly sensitive is used, the vibration application waveform may be easily sensed as vibration by the driver.

The Pacinian corpuscles may correspond to a transient variation moment. The Pacinian corpuscles may be the most sensitive among the above-mentioned receptors.

It is assumable that the Pacinian corpuscles are dominant among receptors by which the driver senses reaction force of a small operation.

Figure 6:
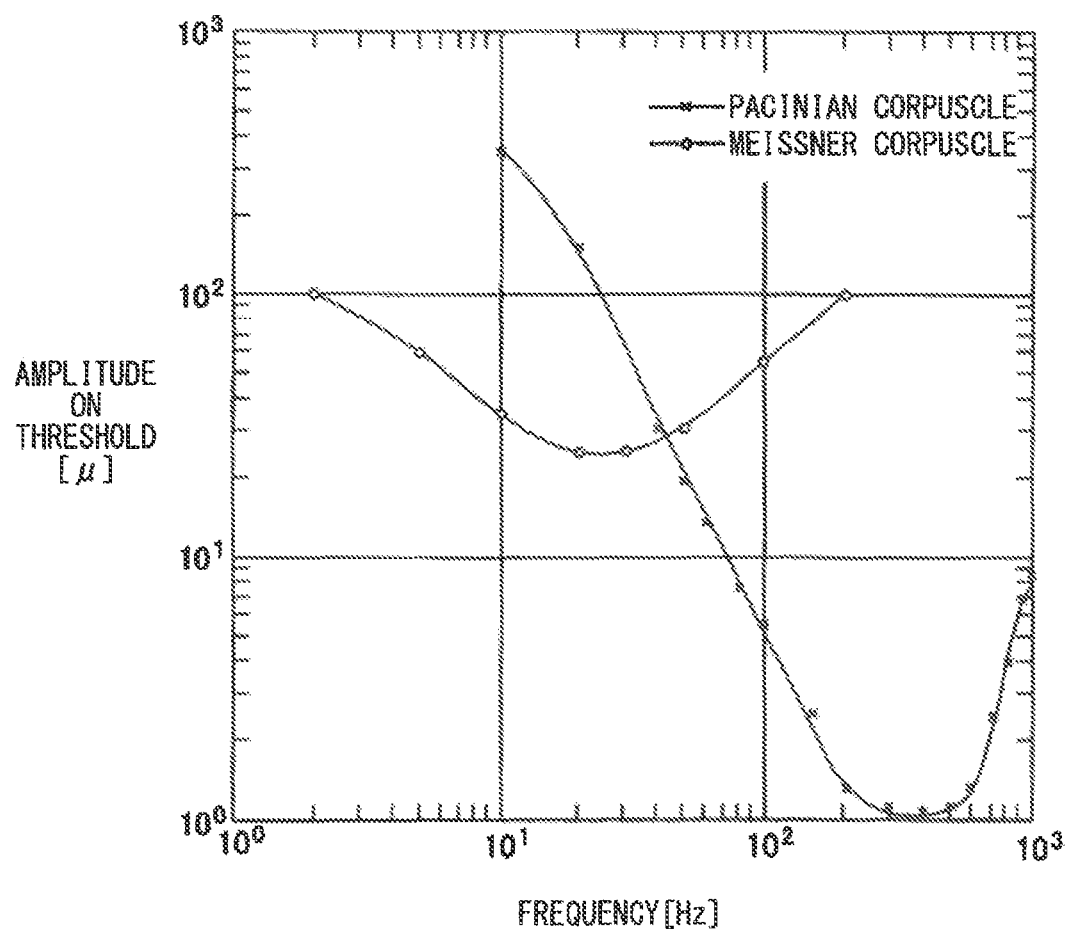
FIG. 6 is a diagram illustrating respective sensitivity distributions of Pacinian corpuscles and Meissner corpuscles with respect to a frequency.

FIG. 6 is a diagram illustrating respective sensitivity distributions of the Pacinian corpuscles and the Meissner corpuscles with respect to a frequency.

In FIG. 6, the horizontal axis represents the frequency. The vertical axis represents an amplitude on a threshold, and the smaller value represents higher sensitivity.

As illustrated in FIG. 6, the Pacinian corpuscles have favorable sensitivity around a region from 100 Hz to 300 Hz both inclusive. For this reason, the vibration application waveform having the dominant frequency within the frequency band from 100 Hz to 300 Hz both inclusive may be used in the example embodiment.

In addition, it is possible to obtain an effect of stimulating the Meissner corpuscles by adding a component within the frequency band from 10 Hz to 50 Hz both inclusive to the vibration application waveform.

The first gain adjustment unit 620 may perform first gain adjustment on the vibration application waveform. The first gain adjustment will be described below.

The first gain adjustment may vary the gain of the vibration application waveform in accordance with variation in the vehicle speed.

The first gain adjustment may be performed in such a manner that the level of the vibration generated by the vibrator 601 is appropriately maintained even in a case where the level of vibration transmitted to the accelerator pedal 30 is varied due to a cause such as vibration received from the road surface in accordance with an increase in the vehicle speed.

Figure 7:
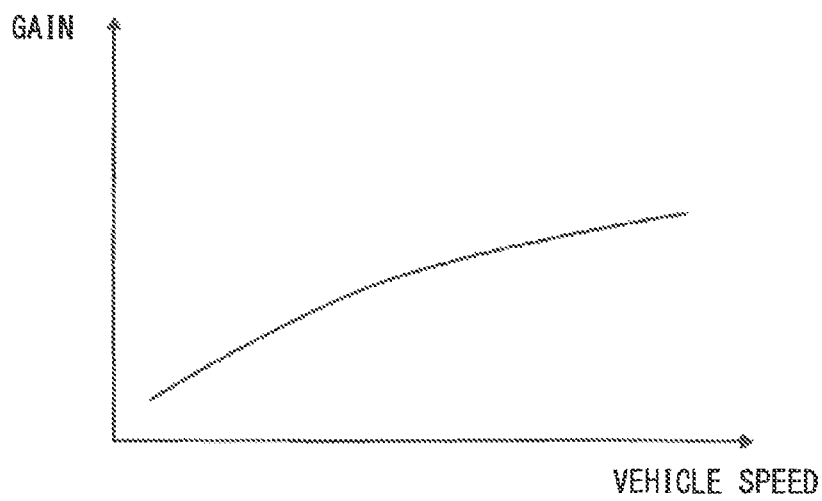
FIG. 7 is a diagram schematically illustrating an example of gain adjustment to be performed by a first gain adjustment unit.

FIG. 7 is a diagram schematically illustrating an example of gain adjustment to be performed by the first gain adjustment unit 620.

In FIG. 7, the horizontal axis represents the vehicle speed, and the vertical axis represents the gain by which the vibration application waveform is to be multiplied.

For example, the gain may be increased in accordance with the increase in the vehicle speed.

The second gain adjustment unit 630 may perform second gain adjustment on the vibration application waveform that has already been subjected to the first gain adjustment. The second gain adjustment will be described below.

The second gain adjustment may be gain adjustment to be performed in accordance with a speed of an operation received by the accelerator pedal 30, i.e., an operation speed of the accelerator pedal 30.

The operation speed of the accelerator pedal 30, or the angular velocity at which the depressing surface member 33 pivots, may be calculated by time differentiation of the operation amount, or the depressed amount, of the accelerator pedal 30 detected by the accelerator pedal sensor 301.

Figure 8:
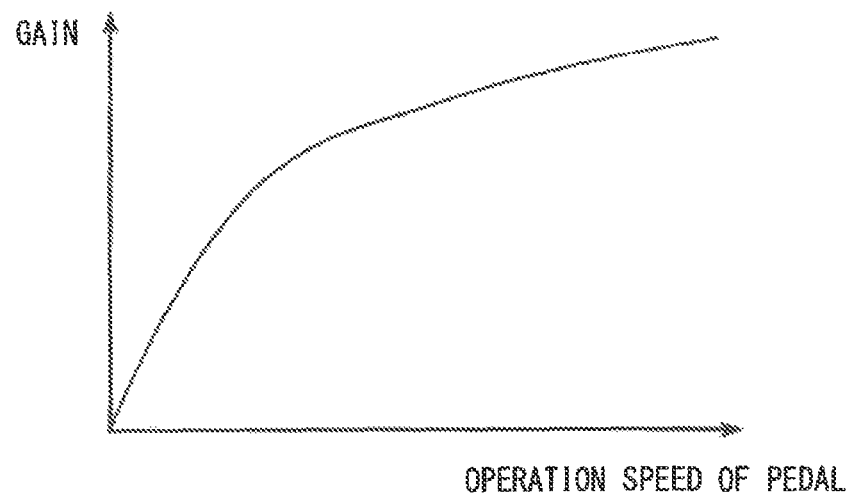
FIG. 8 is a diagram schematically illustrating an example of gain adjustment to be performed by a second gain adjustment unit.

FIG. 8 is a diagram schematically illustrating an example of the gain adjustment to be performed by the second gain adjustment unit 630.

In FIG. 8, the horizontal axis represents a pedal operation speed, and the vertical axis represents the gain by which the vibration application waveform is to be multiplied. The pedal operation speed may be the angular velocity of the depressing surface member 33, for example.

For example, the gain may be increased in accordance with an increase in the pedal operation speed.

Here, an increase rate of the gain with respect to the pedal operation speed may be set in such a manner that: the increase rate is greater in a region where the pedal operation speed is small than in a region where the pedal operation speed is great; and the increase rate gradually decreases in accordance with the increase in the pedal operation speed.

In one example, the second gain adjustment unit 630 may increase the gain in accordance with an increase in the operation amount, or the depressed amount, of the accelerator pedal 30 instead of or together with the increase of the pedal operation speed.

In this case, performing the gain adjustment in accordance with the operation amount of the accelerator pedal 30 makes it possible to achieve an effect related to spring stiffness.

In addition, it is possible to obtain a similar effect by increasing the gain in accordance with an increase in a parameter correlated to the operation amount of the accelerator pedal 30. The parameter correlated to the operation amount of the accelerator pedal 30 may be requested torque or target torque of the traveling power source, for example.

The road surface vibration monitoring unit 640 may monitor the output of the acceleration sensor 102 and hold a history of the output, i.e., an output history, for a predetermined period.

Figure 9:
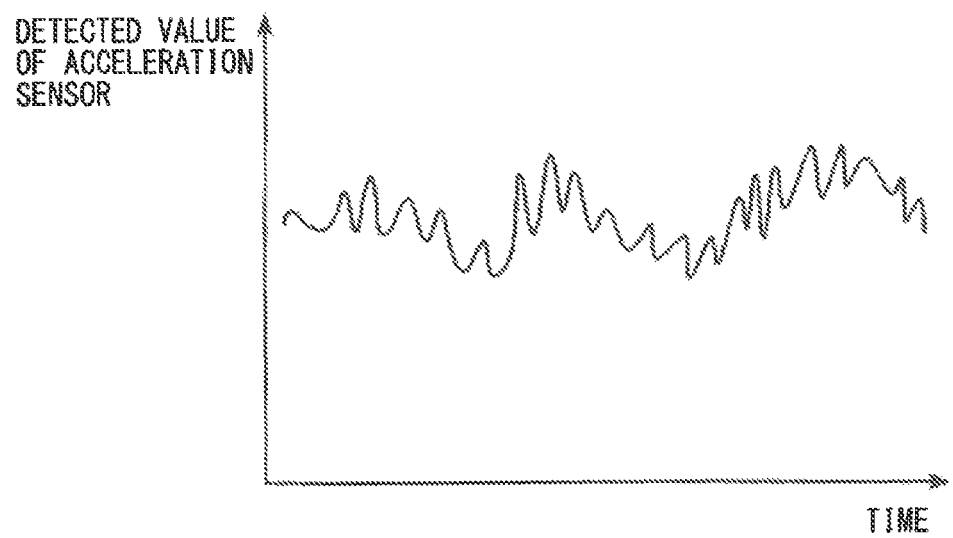
FIG. 9 is a diagram schematically illustrating an example of an output history of an acceleration sensor.

FIG. 9 is a diagram schematically illustrating an example of the output history of the acceleration sensor 102.

In FIG. 9, the horizontal axis represents time, and the vertical axis represents a detected value obtained by the acceleration sensor 102, i.e., the vertical acceleration of the unsprung portion.

Data regarding the output history of the acceleration sensor 102 may be supplied to the vibration amplitude calculation unit 650.

The vibration amplitude calculation unit 650 may extract a component of a particular frequency region by performing bandpass filtering on the output of the acceleration sensor 102 supplied from the road surface vibration monitoring unit 640. The vibration amplitude calculation unit 650 may calculate a vibration amplitude in the particular frequency region.

Figure 10:
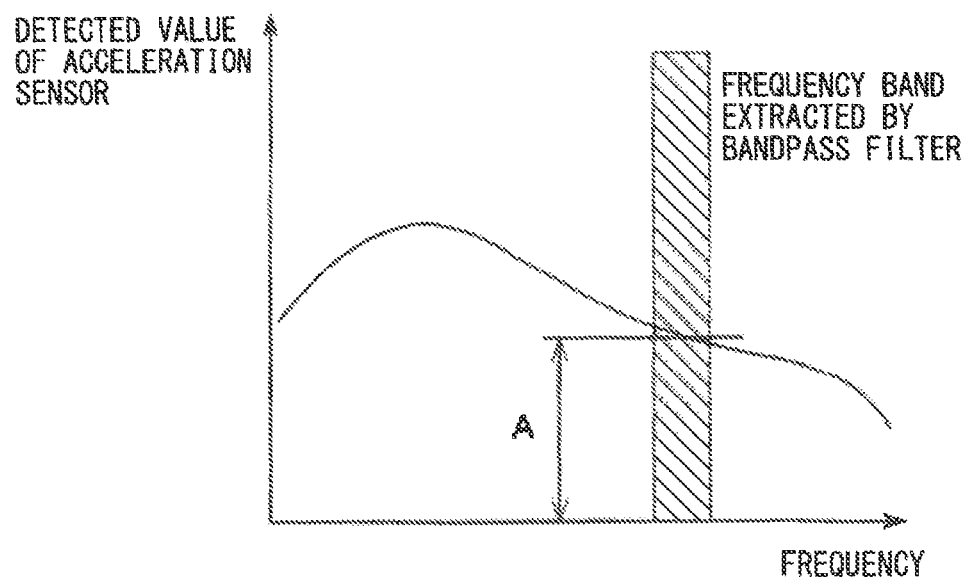
FIG. 10 is a diagram schematically illustrating a method of calculating a vibration amplitude by a vibration amplitude calculation unit.

FIG. 10 is a diagram schematically illustrating a method of calculating the vibration amplitude by the vibration amplitude calculation unit 650.

In FIG. 10, the horizontal axis represents a frequency, and the vertical axis represents the detected value obtained by the acceleration sensor 102.

A bandpass filter may be configured to extract, for example, a frequency band of a portion included in the band from 100 Hz to 300 Hz both inclusive. Such a frequency band may be a frequency band around 250 Hz, for example.

Information regarding a vibration amplitude A in the extracted frequency band may be supplied to the third gain adjustment unit 660. The vibration amplitude A may be an average value of the frequency band, for example.

The third gain adjustment unit 660 may perform third gain adjustment on the noise signal that has already been subjected to the second gain adjustment. The third gain adjustment will be described below.

The third gain adjustment unit 660 may perform the third gain adjustment on the basis of respective outputs of the road surface vibration monitoring unit 640 and the vibration amplitude calculation unit 650.

Figure 11:
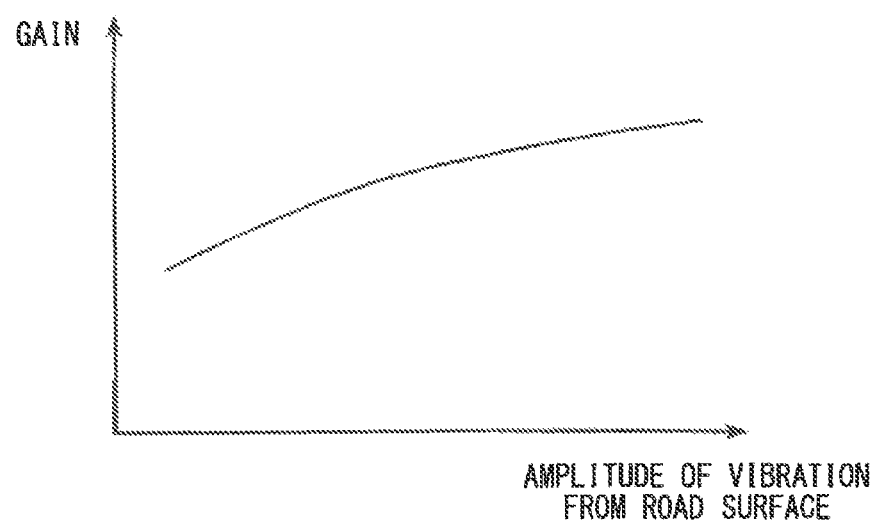
FIG. 11 is a diagram schematically illustrating an example of gain adjustment to be performed by a third gain adjustment unit.

FIG. 11 is a diagram schematically illustrating an example of gain adjustment to be performed by the third gain adjustment unit 660.

In FIG. 11, the horizontal axis represents the vibration amplitude calculated by the vibration amplitude calculation unit 650, and the vertical axis represents the gain by which the vibration application waveform is multiplied.

As illustrated in FIG. 11, the third gain adjustment unit 660 may increase the gain in accordance with an increase in the amplitude of vibration from the road surface.

Regarding the third gain adjustment unit 660, it is assumable that $\Delta A/A$ is the Weber fraction W where $\Delta A$ is the vibration application amplitude added by the vibrator 601 and A is the amplitude of the vibration from the road surface obtained from the vibration amplitude calculation unit 650.

Accordingly, it is assumable that a stable effect is obtainable according to the Weber-Fechner law by performing the gain adjustment in such a manner that the above-described Weber fraction W becomes a predetermined value set in advance.

The gain selection unit 670 may generate gain values that are different in magnitude level on the basis of the value obtained by multiplication with use of the respective gains set by the first gain adjustment unit 620, the second gain adjustment unit 630, and the third gain adjustment unit 660. In addition, the gain selection unit 670 may select one gain value among the gain values in accordance with the traveling mode selected by the traveling mode control unit 500.

For example, in a case where the icy and snowy road traveling mode is selected, the gain selection unit 670 may determine that an acceleration operation difficult state is occurring, and may select a gain that is greater than the gain in the case of the normal traveling. The acceleration operation difficult state may be a state in which the acceleration operation can easily cause spinning of a wheel or a disruption to behavior.

Alternatively, the gain selection unit 670 may determine that the acceleration operation difficult state is occurring and may select a gain that is greater than the gain in the case where the normal mode is selected, for example, in a case where an intervention is performed by one or more of a traction control, an anti-lock brake control, and a behavior stabilization control. The traction control may suppress driving force in a case where idling of a driving wheel is detected. The anti-lock brake control may restore rotation of a wheel in a case where the wheel is locked by braking force. The behavior stabilization control may generate a yaw moment in a direction of suppressing behavior in a case where understeer behavior or oversteer behavior occurs.

In one embodiment, the gain selection unit 670 may serve as an "acceleration operation state determination unit".

A description is given below of effects of the vibration application by the vibrator 601 in the accelerator pedal apparatus according to the example embodiment.

Figure 12:
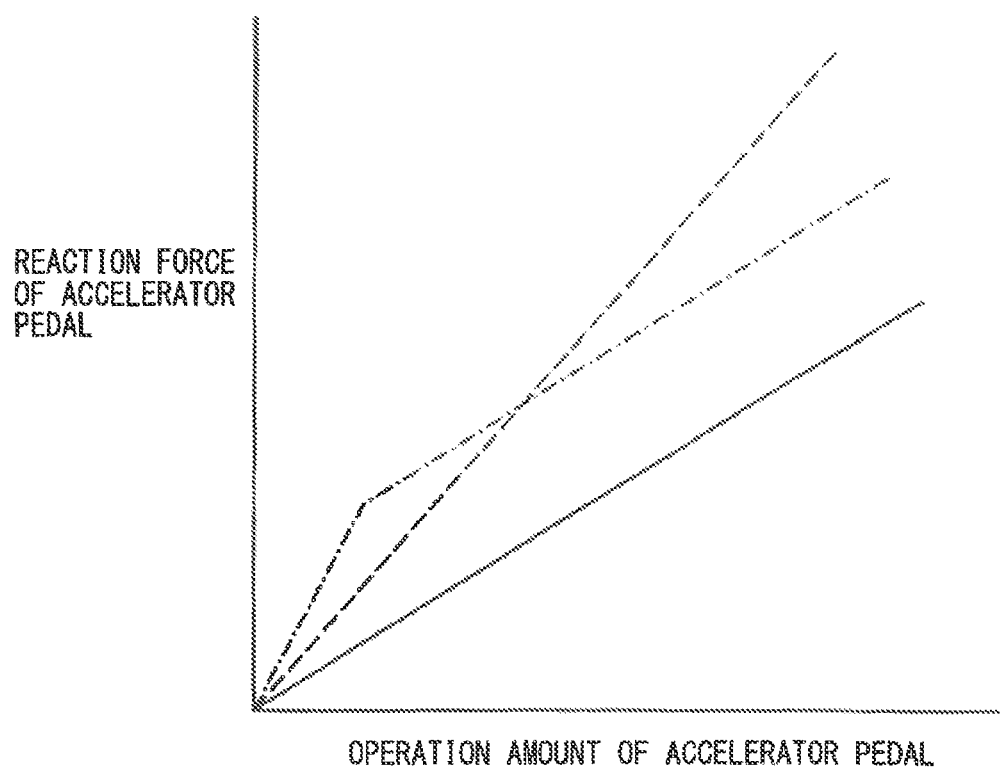
FIG. 12 is a diagram illustrating an example of correlation between an operation amount of an accelerator pedal and reaction force of the accelerator pedal.

FIG. 12 is a diagram illustrating an example of correlation between an operation amount of an accelerator pedal and reaction force of the acceleration pedal.

In FIG. 12, the horizontal axis represents the operation amount of the accelerator pedal 30, and the vertical axis represents reaction force that acts on the occupant's foot.

As indicated by a solid line in FIG. 12, in a case where the reaction force rises linearly with respect to the operation amount and where an increase rate of the reaction force with respect to an amount of an increase in the operation amount is relatively small, the reaction force may be small in a region where the operation amount of the accelerator pedal 30 is small. This may make the area of the sole of the driver's foot receiving pressure small. As a result, it may be difficult for the driver to accurately perceive the reaction force.

In contrast, as indicated by a broken line in FIG. 12, in a case where the increase rate of the reaction force with respect to the amount of the increase in the operation force is relatively increased, it may be possible to increase the reaction force also in the region where the operation amount of the accelerator pedal 30 is small. This may be more appropriate in terms of operability in such a region.

However, in this case, pedal effort to operate the accelerator pedal 30 can increase. This can lead to a concern that the driver may get tired.

Therefore, it may be considered to increase the increase rate of the reaction force with respect to the amount of the increase in the operation force in a region where the operation amount is relatively small and to decrease the increase rate in other regions, as indicated by a dash-dot-dash line in FIG. 12.

However, in this case, linearity of the reaction force with respect to the operation amount can be degraded. This can lead to a concern that the driver may think it unnatural or the driver may be uncomfortable in driving.

In contrast, according to the example embodiment, vibration may be applied to the depressing surface member 33 of the accelerator pedal 30 with the vibration application waveform having the dominant frequency within the frequency band from 100 Hz to 300 Hz both inclusive. The frequency band from 100 Hz to 300 Hz both inclusive may be a frequency band to which the Pacinian corpuscles are highly sensitive. This makes it possible to emphasize the pressure received by the occupant's foot from the depressing surface member 33 by stimulating the receptor in the occupant's foot, without increasing the actual reaction force of the accelerator pedal 30.

It is thus possible to improve the spatial resolution in perceiving the operation amount of the accelerator pedal 30. Accordingly, it is possible to allow the driver to accurately operate the accelerator pedal 30 even if the accelerator pedal 30 has relatively small reaction force to reduce the feeling of fatigue.

According to the example embodiment described above, it is possible to obtain the following effects.

(1) Vibration may be applied to the accelerator pedal 30 with a frequency band to which the Pacinian corpuscles and the Meissner corpuscles are highly sensitive. The Pacinian corpuscles and the Meissner corpuscles are receptors related to the skin sensation. Such application of the vibration to the accelerator pedal 30 may stimulate these receptors. This makes it easier for the driver to perceive the variation in pressure received by the sole of the driver's foot.

This improves the spatial resolution by which the driver perceives the operation amount of the accelerator pedal 30, allowing the driver to perform the pedal operation with high accuracy. It is therefore possible to improve drivability of the vehicle 1 and smoothness of traveling.

In addition, the reaction force of the accelerator pedal 30 may not be to be increased. For example, the spring constant of the spring may not be to be increased. This makes it possible to suppress the fatigue of the driver. In addition, the spatial resolution is improved. This allows for an easier operation even with less strokes, making it possible to improve space efficiency and to reduce the fatigue of the driver.

Accordingly, even in a case where the vehicle is the electric vehicle that uses the motor generator 310 as the traveling power source and where no or less vibration is transmitted to the accelerator pedal 30 from the engine or the driving system via a member such a throttle cable or a linkage, it is possible to secure the above-described effects by applying vibration to the accelerator pedal 30 and thereby stimulating the receptors related to the skin sensation.

(2) In a case where the icy and snowy road traveling mode that can hinder the acceleration operation is selected, the amplitude of the vibration application waveform may be increased. This promotes the above-described effect of making the pedal operation more accurate. It is therefore possible to prevent the vehicle 1 from being in an unstable state or in a risky situation. It is also possible to prevent the driver from being annoyed by a control frequently performed on the vehicle 1. The driver may be annoyed in such a way, for example, in a case where an intervention is frequently performed by the traction control or the behavior control.

(3) The amplitude of the vibration application waveform may be increased in accordance with an increase in the amplitude of the vibration propagating from the road surface. The increase in the amplitude of the vibration propagating from the road surface may be caused by an increase in the vehicle speed. This makes it possible to secure the above-described effects.

(4) The amplitude of the vibration application waveform may be increased in accordance with an increase in the operation speed of the accelerator pedal 30. This makes it possible to effectively improve the easiness of causing the driver to feel the reaction force in a case where the driver performs operations of depressing and releasing the accelerator pedal 30. For example, in a case where the operation speed of the accelerator pedal 30 is high, the feeling of the reaction force, or the feeling of the pressure, may be emphasized by increasing the amplitude of the vibration application. This allows the driver to feel the change corresponding to the operation speed. In addition, this allows for workings as a damping term.

(5) The amplitude of the vibration application waveform may be increased in accordance with an increase in the amplitude of the vibration input from the road surface. This makes it possible to secure the above-described effects by increasing the amplitude of the vibration application waveform even in a case where the vibration transmitted from the road surface is increased, for example, by the roughness of the road surface or the pattern shape of the tire.

Modifications

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof (1) The respective configurations of the accelerator pedal apparatus, the traveling power source controlled by the accelerator pedal apparatus, and the vehicle are not limited to those described above in the example embodiment and are modifiable as appropriate.

For example, an embodiment of the disclosure is applicable to a vehicle such as a hybrid electric vehicle (HEV) using both an engine and an electric motor or a vehicle that uses an internal combustion engine but not an electric motor as the traveling power source.

(2) According to the example embodiment, the acceleration operation difficult state may be determined as being occurring in a case where the icy and snowy road traveling mode is selected; however, this is non-limiting. The acceleration operation difficult state may be detected by any other method.

For example, in a case of a vehicle having a rough road traveling mode or a sport traveling mode, the amplitude of the vibration application waveform may be increased in a case where the rough road traveling mode or the sport traveling mode is selected. The rough road traveling mode may be a traveling mode for traveling a rough road such as a muddy road. The sport traveling mode may be a traveling mode in which the excess force of tire longitudinal force becomes small in a case where tire lateral force is great.

In a case where the vehicle is configured to estimate a coefficient of friction of the road surface, the acceleration operation difficult state may be determined as being occurring if the estimated coefficient of friction is decreased.

In addition, the acceleration operation difficult state may be determined as being occurring in a case where the outside air temperature is lower than or equal to a predetermined threshold. The predetermined threshold may be a value at which a risk of freezing of the road surface is high.

In addition, the acceleration operation difficult state may be determined as being occurring in a case where a raining state, a snowing state, or an unpaved road traveling state is determined.

In addition, the acceleration operation difficult state may be determined as being occurring in a case where the frequency of detection of a slip-up of a driving wheel or a wheel spin due to excessively great driving force is higher than or equal to predetermined frequency. The frequency of detection of such a slip-up or a wheel spin may be frequency of intervention by the traction control, for example.

(3) According to the example embodiment, the vibration from the road surface may be detected on the basis of the acceleration of the unsprung portion of the suspension. However, the method of detecting the vibration from the road surface is not limited thereto and is modifiable as appropriate.

For example, a vibration pickup may be provided at a pipe for the brake fluid, or a brake line, that is coupled to the wheel cylinder provided at the unsprung portion.

In addition, the vibration from the road surface may be detected on the basis of the output of the torque sensor of the power steering system.

(4) According to the example embodiment, the rectangular wave may be used as an example of the vibration application waveform. However, this is non-limiting. For example, the noise signal of any other waveform such as a sine wave, a triangular wave, or a random wave may be used. In addition, a method of adjusting a gain is not limited to that described in the example embodiment and is modifiable as appropriate.

(5) For example, the configuration of the vibrator or the vibration application unit, the principles of the vibration application, the location to provide the vibrator or the vibration application unit are not limited to those described in the example embodiment and are modifiable as appropriate.

(6) The configuration of the accelerator pedal in the example embodiment is a mere example. An embodiment of the disclosure may be applicable to an accelerator pedal having any other configuration. For example, an embodiment of the disclosure may be applied to a so-called organ-type accelerator pedal in which a support shaft to allow the depressing surface member to pivot is provided below the depressing surface member.

Human recognition of operation force (reaction force) may include deep sensation and skin sensation. Reacting of the receptor corresponding to each of the deep sensation and the skin sensation allows a human to feel the reaction force. In a region where the reaction force is small, corresponding to the beginning of depressing of the pedal, the skin sensation may be dominant.

According to an embodiment of the disclosure, vibration may be applied to the pedal in one or more of the following frequency bands: the frequency band from 100 Hz to 300 Hz both inclusive to which the Pacinian corpuscles, which are receptors for the skin sensation, are highly sensitive; and the frequency band from 10 Hz to 50 Hz both inclusive to which the Meissner corpuscles, which are receptors for the skin sensation, are highly sensitive. The receptors such as the Pacinian corpuscles and the Meissner corpuscles may thus be stimulated. This makes it easier for the driver to feel the variation in the pressure received by the sole of his or her foot. It is possible to more effectively obtain such an effect by applying vibration to the pedal with the frequency band to which the Pacinian corpuscles are highly sensitive. The Pacinian may react the fastest in terms of the skin sensation.

The spatial resolution by which the driver perceives the operation amount of the pedal thus improves, which allows a highly accurate pedal operation to be performed. As a result, it is possible to improve drivability of the vehicle and smoothness of traveling.

In addition, the reaction force of the pedal itself may not be to be increased. For example, the spring constant of the spring may not be to be increased. Therefore, the feeling of fatigue given to the driver may not increase.

For example, in a case of an electric vehicle that uses a motor generator as the traveling power source or in a case of a throttle-by-wire vehicle in which a throttle of an internal combustion engine is driven by an electric actuator, propagation of vibration from the engine or the driving system to the pedal via a member such as a throttle cable or a linkage can be reduced. Such propagation of vibration has been an issue in an existing vehicle.

According to an embodiment of the disclosure, it is possible to secure the above-described effects also in such a case by stimulating the receptor related to the skin sensation by applying vibration to the pedal.

In addition, the amplitude of the vibration application waveform may be increased in a situation where it is difficult to perform the acceleration operation. Examples of a typical situation where it is difficult to perform the acceleration operation may include an icy and snowy road, a muddy road, and an unpaved road. This promotes the above-described effect of making the pedal operation more accurate. It is therefore possible to prevent the vehicle from being in an unstable state or in a risky situation. It is also possible to prevent the driver from being annoyed by a complicated control performed on the vehicle 1. The driver may be annoyed in such a way, for example, in a case where an intervention is frequently performed by the traction control or the behavior control.

For example, the vehicle may have driving modes selectable by the driver. In a case where a low coefficient-of-friction road traveling mode is selected by the driver, the acceleration operation difficult state may be determined as being occurring. The low coefficient-of-friction road traveling mode may be an icy and snowy road traveling mode or a rough road traveling mode, for example. Alternatively, for example, the acceleration operation difficult state may be determined as being occurring in a case where an intervention is performed by one or more of the traction control, the anti-lock brake control, and the behavior stabilization control. The traction control may suppress driving force in a case where idling of a driving wheel is detected. The anti-lock brake control may restore rotation of a wheel in a case where the wheel is locked by braking force. The behavior stabilization control may generate a yaw moment in a direction of suppressing behavior in a case where understeer behavior or oversteer behavior occurs.

In addition, even in a case where the amplitude of the vibration propagating from the road surface increases in accordance with an increase in the vehicle speed, it is possible to secure the above-described effects by increasing the amplitude of the vibration application waveform in accordance with the increase in the amplitude of the vibration propagating from the road surface.

In an embodiment of the disclosure, an operation speed detector may be provided. The operation speed detector may detect the operation speed of the accelerator pedal. The vibration application control processor may be configured to increase the amplitude of the vibration application waveform in accordance with an increase in the operation speed.

Accordingly, it is possible to effectively improve the easiness of causing the driver to feel the reaction force in a case where the driver performs operations of depressing and releasing the pedal, by increasing the amplitude of the vibration application waveform in accordance with the increase in the operation speed of the pedal. For example, in a case where the operation speed is high, the feeling of the reaction force, or the feeling of the pressure, may be emphasized by increasing the amplitude of the vibration application. This allows the driver to feel the change corresponding to the operation speed. In addition, this allows for workings as a damping term.

In addition, for example, even in a case where the vibration transmitted from the road surface is increased, for example, by the roughness of the road surface or the pattern shape of the tire, it is possible to secure the above-described effects by increasing the amplitude of the vibration application waveform.

For example, as a vibration input detector, any of the following sensors may be used: an acceleration sensor that detects the acceleration of the unsprung portion of the vehicle, that is, a portion that is movable with respect to the vehicle body in accordance with a stroke of the suspension; a torque sensor that detects torque acting on the steering shaft in the power steering system; and any other sensor.

For example, the vibration application control processor may extract a particular frequency band of the vibration input from the road surface, and may increase the amplitude of the vibration application waveform in accordance with an increase in the amplitude in the extracted band. The particular frequency band may typically be a band including a band from 100 Hz to 300 Hz both inclusive.

As described above, according to an embodiment of the disclosure, it is possible to provide an accelerator pedal apparatus that is able to improve accuracy of an operation to be performed by an occupant.

The brake control unit 100, the hydraulic control unit 200, the motor generator control unit 300, the power steering control unit 400, the traveling mode control unit 500, and the vibrator control unit 600 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the brake control unit 100, the hydraulic control unit 200, the motor generator control unit 300, the power steering control unit 400, the traveling mode control unit 500, and the vibrator control unit 600. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the brake control unit 100, the hydraulic control unit 200, the motor generator control unit 300, the power steering control unit 400, the traveling mode control unit 500, and the vibrator control unit 600 illustrated in FIG. 1.

The invention claimed is:

1. An accelerator pedal apparatus in which an acceleration operation for a vehicle is to be performed by a pedal of the vehicle, the pedal being configured to be operated by a foot, the accelerator pedal apparatus comprising:
   a vibration application unit including a vibrator configured to apply vibration to the pedal; and
   a vibration application control processor configured to;
      generate a first vibration application waveform comprising one or both of a frequency component that is higher than or equal to 10 hertz and lower than or equal to 50 hertz and a frequency component that is higher than or equal to 100 hertz and lower than or equal to 300 hertz;

determine a gain based on control information of the vehicle;

generate, based on multiplying the first vibration application waveform by at least the gain to adjust an amplitude of the vibration application waveform, a second vibration application waveform; and cause the vibration application unit to apply the vibration to the pedal with the second vibration application waveform, wherein the control information of the vehicle includes at least one of: information on a vehicle speed of the vehicle; information on an operation speed of the pedal being a speed of an operation received by the pedal; and information on a vibration input to the vehicle from a road surface of a road where the vehicle travels.

2. The accelerator pedal apparatus according to claim 1, further comprising a vehicle speed detector configured to detect the vehicle speed of the vehicle, wherein the vibration application control processor is configured to increase the gain in accordance with an increase in the vehicle speed so that a first amplitude of the second vibration application waveform upon detecting a first vehicle speed as the vehicle speed is greater than a second amplitude of the second vibration application waveform upon detecting a second vehicle speed less than the first vehicle speed as the vehicle speed.

3. The accelerator pedal apparatus according to claim 2, further comprising an operation speed detector configured to detect the operation speed of the pedal, wherein the vibration application control processor is configured to increase the gain in accordance with an increase in the operation speed.

4. The accelerator pedal apparatus according to claim 3, further comprising a vibration input detector configured to detect the vibration input from the road surface, wherein the vibration application control processor is configured to increase the gain in accordance with an increase in an amplitude of the vibration input.

5. The accelerator pedal apparatus according to claim 2, further comprising a vibration input detector configured to detect the vibration input from the road surface, wherein the vibration application control processor is configured to increase the gain in accordance with an increase in an amplitude of the vibration input.

6. The accelerator pedal apparatus according to claim 1, further comprising an operation speed detector configured to detect the operation speed of the pedal, wherein the vibration application control processor is configured to increase the gain in accordance with an increase in the operation speed so that a first amplitude of the second vibration application waveform upon detecting a first operation speed of the pedal as the operation speed of the pedal is greater than a second amplitude of the second vibration application waveform upon detecting a second operation speed of the pedal less than the first operation speed of the pedal as the operation speed of the pedal.

7. The accelerator pedal apparatus according to claim 6, further comprising a vibration input detector configured to detect the vibration input from the road surface, wherein the vibration application control processor is configured to increase the gain in accordance with an increase in an amplitude of the vibration input.

8. The accelerator pedal apparatus according to claim 1, further comprising a vibration input detector configured to detect the vibration input from the road surface, wherein the vibration application control processor is configured to increase the gain in accordance with an increase in an amplitude of the vibration input so that a first amplitude of the second vibration application waveform upon detecting a first vibration input as the vibration input is greater than a second amplitude of the second vibration application waveform upon detecting a second vibration input less than the first vibration input as the vibration input.

9. The accelerator pedal apparatus according to claim 1, wherein the vehicle is configured to switch a traveling mode representing a traveling characteristic of the vehicle from a first traveling mode to a second traveling mode different from the first traveling mode in accordance with an operation of a traveling mode selection switch received from a driver who drives the vehicle, wherein the vibration application control processor is configured to:

generate multiple gains based on the control information of the vehicle; and select, in response to the vehicle switching the traveling mode from the first traveling mode to the second traveling mode, a second gain as the gain from the multiple gains so that a second amplitude of the second vibration application waveform in a case where the vehicle travels in the second traveling mode is greater than a first amplitude of the second vibration application waveform in a case where the vehicle travels in the first traveling mode, and wherein the second gain is greater than a first gain selected in the case where the vehicle travels in the first traveling mode.

10. The accelerator pedal apparatus according to claim 9, wherein the vehicle is configured to indicate that the second traveling mode is a traveling mode adapted to travel at least one of an icy and snowy road, a muddy road and an unpaved road than the first mode.

11. The accelerator pedal apparatus according to claim 1, wherein the vehicle is configured to perform one or more controls of:

a traction control;

an anti-lock brake control; and a behavior stabilization control configured to generate a yaw moment in a direction of suppressing behavior of the vehicle in a case where understeer behavior or oversteer behavior of the vehicle occurs as the behavior of the vehicle, wherein the vibration application control processor is configured to:

generate multiple gains based on the control information of the vehicle; and select, in response to the vehicle performing the one or more controls, a second gain as the gain from the multiple gains so that a second amplitude of the second vibration application waveform after performing the one or more controls is greater than a first amplitude of the second vibration application waveform before performing the one or more controls, and wherein the second gain is greater than a first gain selected before performing the one or more controls.

12. The accelerator pedal apparatus according to claim 1, wherein the pedal includes a lever, a bracket provided at a first end of the lever and configured to support the lever to be pivotable about a rotation axis extending along a width direction of the vehicle, and a depressing surface member provided at a second end of the lever opposite to the first end and configured to come into contact with a sole of the driver, and wherein the vibrator is attached to the bracket and configured to sequentially propagate a vibration through the bracket, the lever, and the depressing surface member to the sole of the driver.

* * * * *